United States Patent
Sharma et al.

(10) Patent No.: US 10,859,691 B2
(45) Date of Patent: Dec. 8, 2020

(54) RADAR RANGE ACCURACY IMPROVEMENT METHOD

(71) Applicant: Infineon Technologies AG, Neubiberg (DE)

(72) Inventors: Munish Sharma, San Jose, CA (US); Pooja Agrawal, Milpitas, CA (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 160 days.

(21) Appl. No.: 16/108,759

(22) Filed: Aug. 22, 2018

(65) Prior Publication Data

US 2020/0064457 A1 Feb. 27, 2020

(51) Int. Cl.
| G01S 13/34 | (2006.01) |
| G01S 7/282 | (2006.01) |
| G01S 7/285 | (2006.01) |
| H01Q 19/10 | (2006.01) |
| G01S 13/00 | (2006.01) |

(52) U.S. Cl.
CPC ............ *G01S 13/345* (2013.01); *G01S 7/282* (2013.01); *G01S 7/285* (2013.01); *H01Q 19/106* (2013.01)

(58) Field of Classification Search
CPC ........ G01S 13/345; G01S 7/282; G01S 7/285; H01Q 19/106
See application file for complete search history.

(56) References Cited

U.S. PATENT DOCUMENTS

| 4,829,305 | A | * | 5/1989 | LaBudde | ................ | G01S 13/32 342/118 |
| 5,148,175 | A | * | 9/1992 | Woolfolk | ................ | G01S 13/18 342/85 |
| 6,040,898 | A | * | 3/2000 | Mrosik | ................... | G01S 17/36 356/5.09 |
| 6,115,112 | A | * | 9/2000 | Hertzman | ............... | G01S 7/487 356/5.01 |
| 6,373,427 | B1 | * | 4/2002 | Hohne | .................... | G01S 7/354 342/128 |
| 9,568,601 | B1 | * | 2/2017 | Xu | .......................... | G01S 13/38 |
| 10,145,948 | B2 | * | 12/2018 | Warke | ................... | G01S 7/4865 |
| 10,613,208 | B2 | * | 4/2020 | Ali | ........................ | G01S 13/343 |
| 2002/0093640 | A1 | * | 7/2002 | Watanabe | ............. | G01S 7/4915 356/5.01 |
| 2007/0285302 | A1 | * | 12/2007 | Aarseth | ................. | G01S 13/282 342/25 R |
| 2015/0338514 | A1 | * | 11/2015 | Sato | ........................ | G01S 13/34 342/27 |
| 2017/0102455 | A1 | * | 4/2017 | Neisz | .................... | G01S 7/4865 |

FOREIGN PATENT DOCUMENTS

GB 1388617 A * 3/1975 ............. G01S 7/497

* cited by examiner

*Primary Examiner* — Bernarr E Gregory

(74) *Attorney, Agent, or Firm* — Slater Matsili, LLP

(57) ABSTRACT

A method for determining a range of a target includes receiving a first time based radar return signal, converting the first time based radar return signal into a first frequency domain signal, detecting a peak of the first frequency domain signal, the peak corresponding to a coarse target range, receiving a second time based radar return signal, using the detected peak of the first frequency domain signal and the second time based radar return signal, converting the second time based radar return signal into a second frequency domain signal, and detecting a peak of the second frequency domain signal, the peak corresponding to a fine target range.

20 Claims, 10 Drawing Sheets

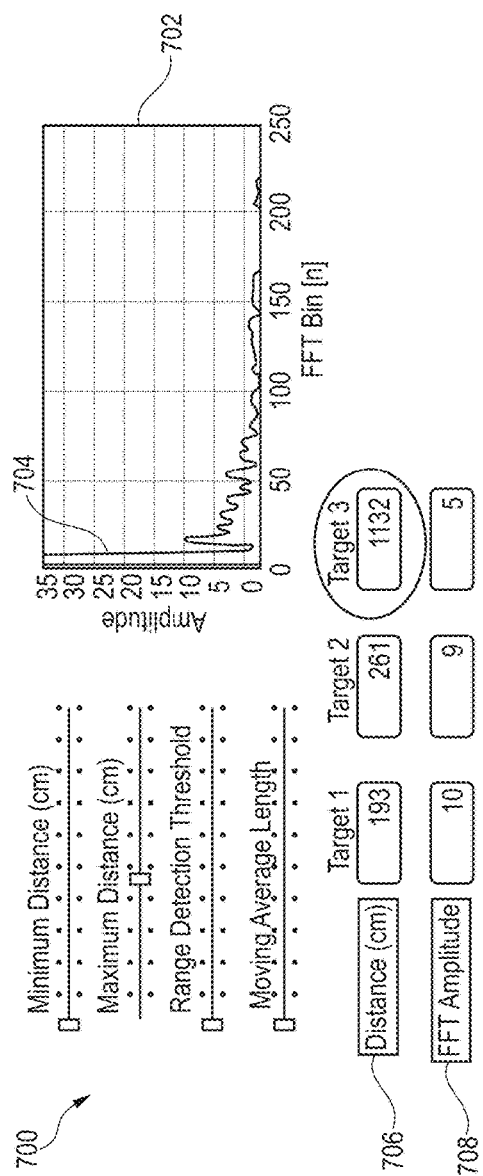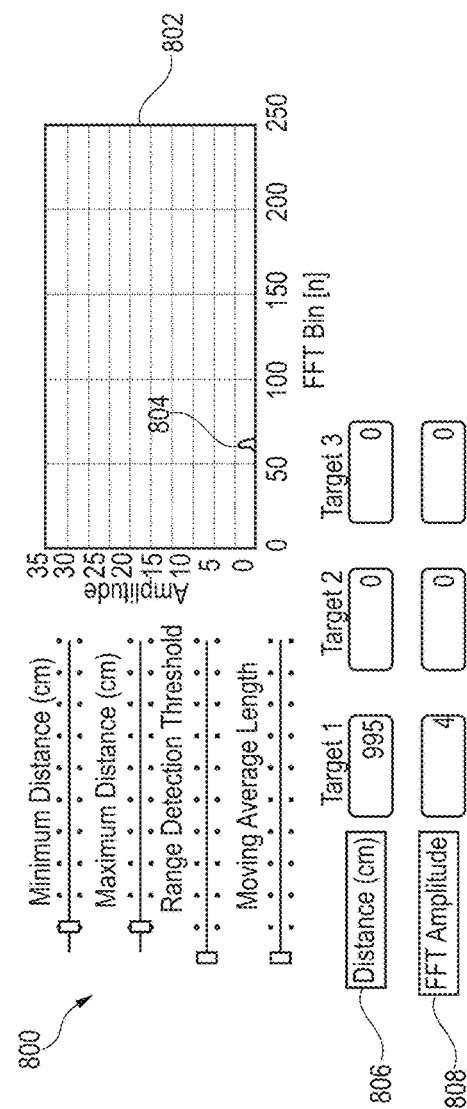

RADAR RANGE ACCURACY IMPROVEMENT METHOD

TECHNICAL FIELD

The present invention relates generally to a system and method for improving radar range accuracy, and in particular that of Frequency-Modulated Continuous-Wave ("FMCW") radars.

BACKGROUND

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques.

In industrial applications, accurately estimating radar range is of interest to the radar community. For instance, in FMCW stretch processing, the target range resolution and thereby its accuracy is limited by radar bandwidth. Range resolution is the ability of a radar system to distinguish between two or more targets on the same bearing but at different ranges. The degree of range resolution depends on the width of the radar bandwidth, transmitted pulse, the types and sizes of targets, and the efficiency of the receiver and indicator.

SUMMARY

A method for determining a range of a target comprises receiving a first time based radar return signal; converting the first time based radar return signal into a first frequency domain signal; detecting a peak of the first frequency domain signal, the peak corresponding to a coarse target range; receiving a second time based radar return signal; using the detected peak of the first frequency domain signal and the second time based radar return signal, converting the second time based radar return signal into a second frequency domain signal; and detecting a peak of the second frequency domain signal, the peak corresponding to a fine target range.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 is a radar output display for a target at ten meters, wherein the radar return signal is processed at a first resolution, according to an embodiment;

FIG. 8 is a radar output display for the target at ten meters as in FIG. 7, wherein the radar return signal is processed at a second resolution, according to an embodiment;

DETAILED DESCRIPTION OF ILLUSTRATIVE EMBODIMENTS

Embodiment systems and methods for improving radar range accuracy relate to various types of radars, and in particular, to FMCW radars, which are described below.

In embodiments of the present invention, precise measurements are achieved by performing one or more coarse measurements to determine a general range of a target, and then performing at least one level of fine measurements based on the determined range of the coarse measurement. By using combinations of coarse and fine measurements, a precise range measurement can be made efficiently and quickly.

Figure 1A:
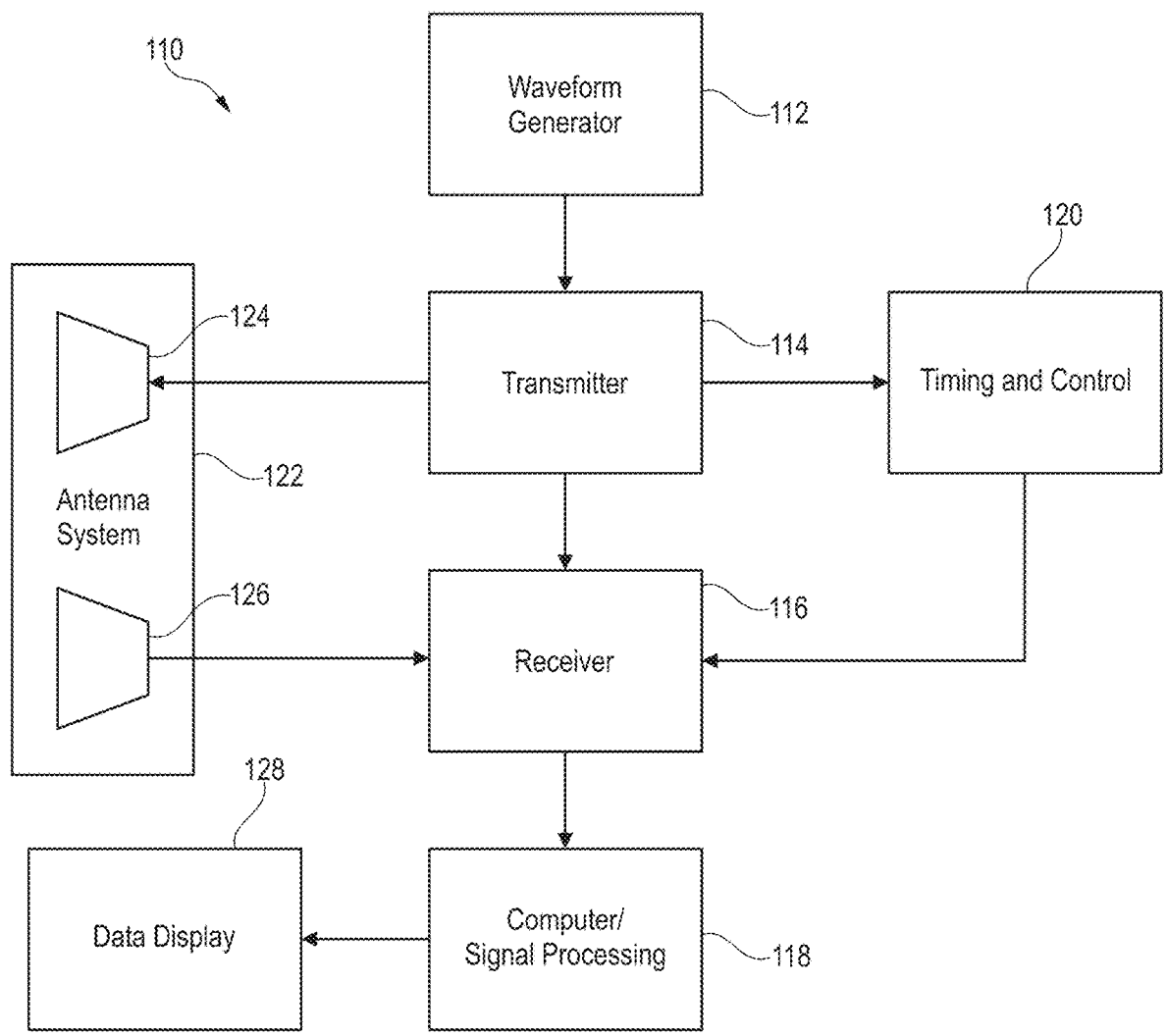
FIG. 1A is a block diagram of a radar system according to the prior art.

FIG. 1A is a diagram of a radar system 110 in which a computer/signal processing block 118 is configured to perform embodiment radar processing methods. Radar system 110 is not necessarily limited to FMCW radars, but could include other types of radars. Radar system 110 includes a waveform generator 112 in communication with a transmitter 114. The transmitter 114 is in communication with a transmit antenna 124 that is part of an antenna system 122, as well as in communication with timing and control circuitry 120. The timing and control circuitry is in communication with a receiver 116, which receives the radar return signals from the receive antenna 126. The output signals of receiver 116 are processed in by a computer 118 including signal processing circuitry. The processed results, which can include the distance or range of target, as well as the size of the target are displayed on a data display 128 for observation by an operator.

Figure 1B:
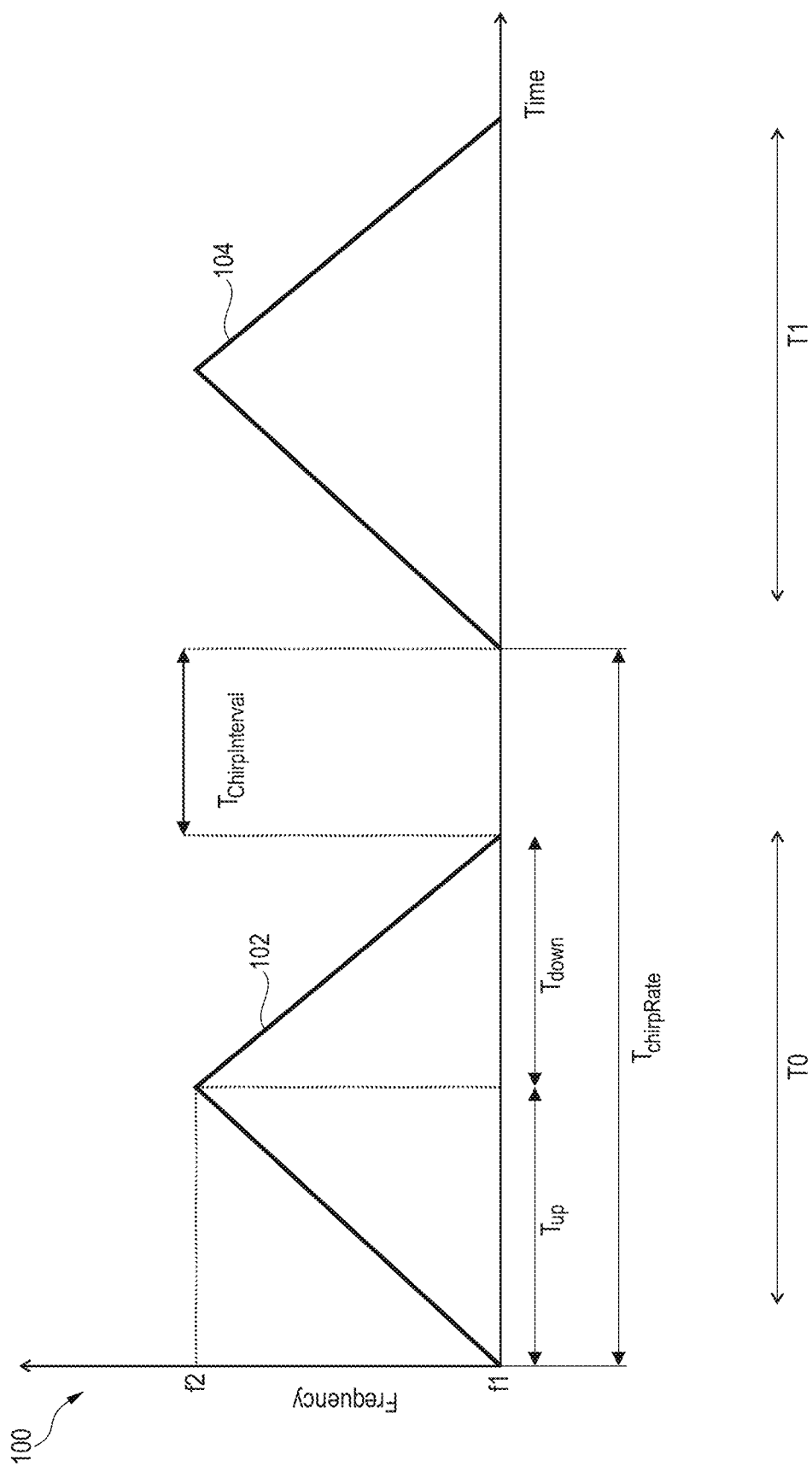
FIG. 1B is a timing diagram of a radar transmit signal including two individual chirps.

FIG. 1B is a timing diagram 100 of a radar transmit signal including two individual chirps 102 and 104. Chirp 102 occurs during time period $T_0$ and chirp 104 occurs during time period $T_1$. Chirp 102 can be associated with range determination using a first resolution and level of accuracy, and chirp 104 can be associated with range determination using a second resolution and level of accuracy, as is explained in further detail below. In the embodiment shown in FIG. 1 each chirp has a linearly increasing frequency signal from a first frequency f1 to a second frequency f2 during a first time period $T_{UP}$ and a linearly decreasing frequency signal from the first frequency f1 to the second frequency f2 during a second time period $T_{DOWN}$. The chirp rate $T_{ChirpRate}$ is given by the sum of the first time period $T_{UP}$, the second time period $T_{DOWN}$, and a time interval between the chirps, $T_{ChirpInterval}$. As is known in the art, the transmit signal is used generate a signal reflected from one or more targets, which is subsequently processed to determine the range of the targets.

While a triangular waveform is shown for the chirps 102 and 104 of the transmit signal shown in FIG. 1, other types of transmit signals can be used, and either the upside (portion of the chirp associated with the first time period $T_{UP}$), the downside (portion of the chirp associated with the second time period $T_{DOWN}$), or both the upside and the downside of the chirps may be used to analyze the radar return signals.

Figure 2:
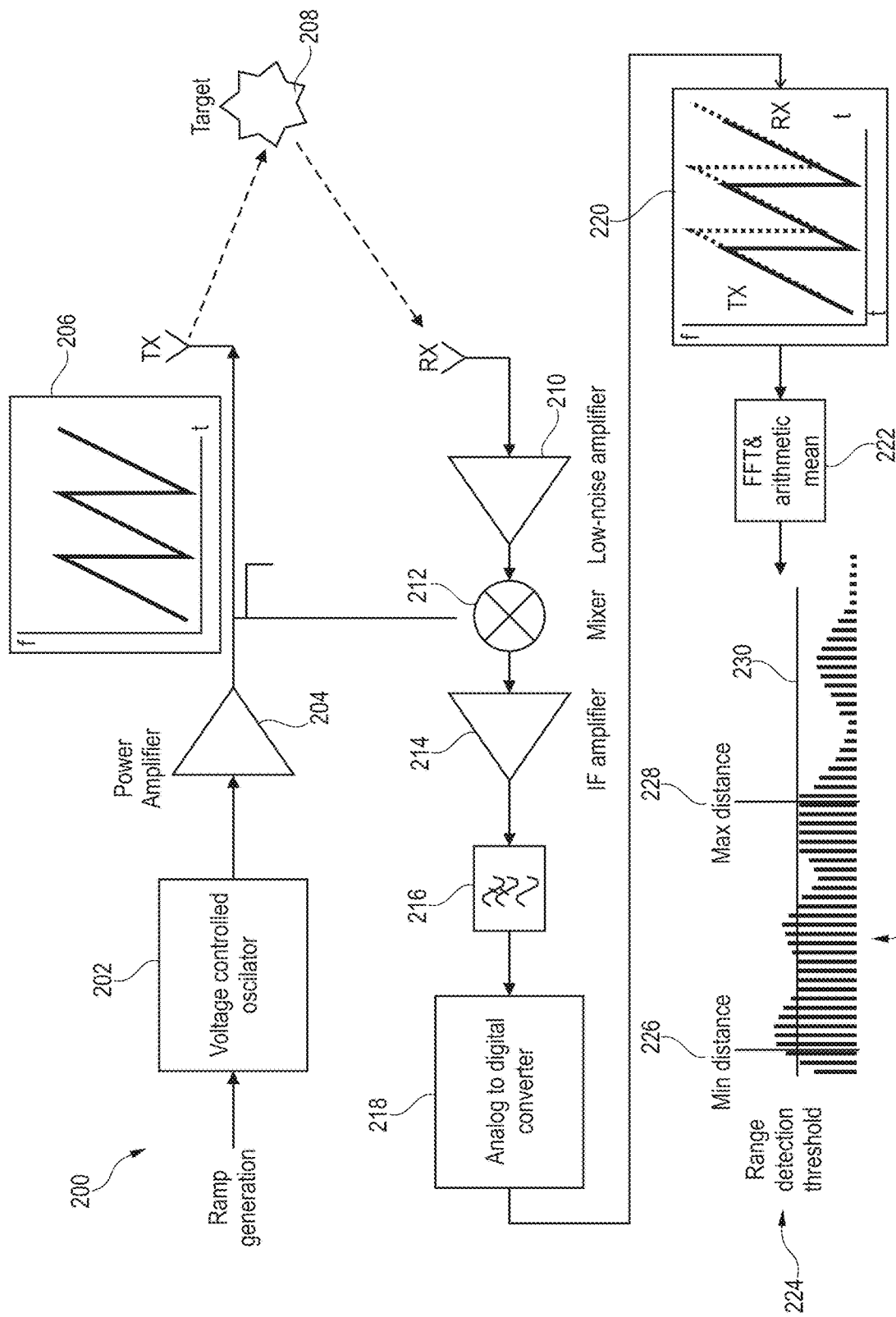
FIG. 2 is a block diagram of an FMCW radar system, according to an embodiment.

FIG. 2 is a block diagram 200 of a radar system, such as a FMCW radar system, according to an embodiment. Portions of the FMCW radar system can be implemented in one or more integrated circuits, including antenna arrays for the transmit and receive antennas. Multiple integrated circuit implementations can comprise a module including discrete components. External antennas can also be used with the module.

An embodiment FMCW radar comprises a transceiver and a control unit with a microprocessor or other digital signal processors. The transceiver can be manufactured as a compact module including one or more integrated circuits, and usually includes a separate transmit (TX) and receive (RX) antenna. The high frequency transmit signals are generated by a voltage controlled oscillator 202 controlled by a ramp generator, that directly feeds the transmitting antenna TX, or its power is additionally amplified through power amplifier 204. A representative transmit signal 206 is shown comprising a plurality of frequency chirps as previously described. A part of the high frequency is coupled out and fed to a mixer 212, which down converts the received (through RX antenna) and amplified (through low noise amplifier 210) echo signal (from target(s) 208) in the baseband. Intermediate frequency ("IF") signals from the IF amplifier 214 are filtered through filter 216 to provide the frequencies of interest. The output of filter 216 is converted into digital signals by Analog-to-Digital Converter ("ADC") 218. A representative combined digital signal 220 is shown including both the transmit TX and receive TX components that are further processed in the FFT ("Fast Fourier Transform") and arithmetic mean block 222, which is described in further detail below, particularly with respect to the flow chart of FIG. 9.

The range detection threshold 224 is also shown in FIG. 2, including a plurality of frequency bins 232, a minimum distance range 226, a maximum distance range 228, and an amplitude threshold 230. The minimum distance range 226, the maximum distance range 228, and the amplitude threshold 230 are dynamically and automatically updated between a coarse distance range processing step and at least one fine distance range processing step, according to an embodiment as is explained in further detail below.

Figure 3:
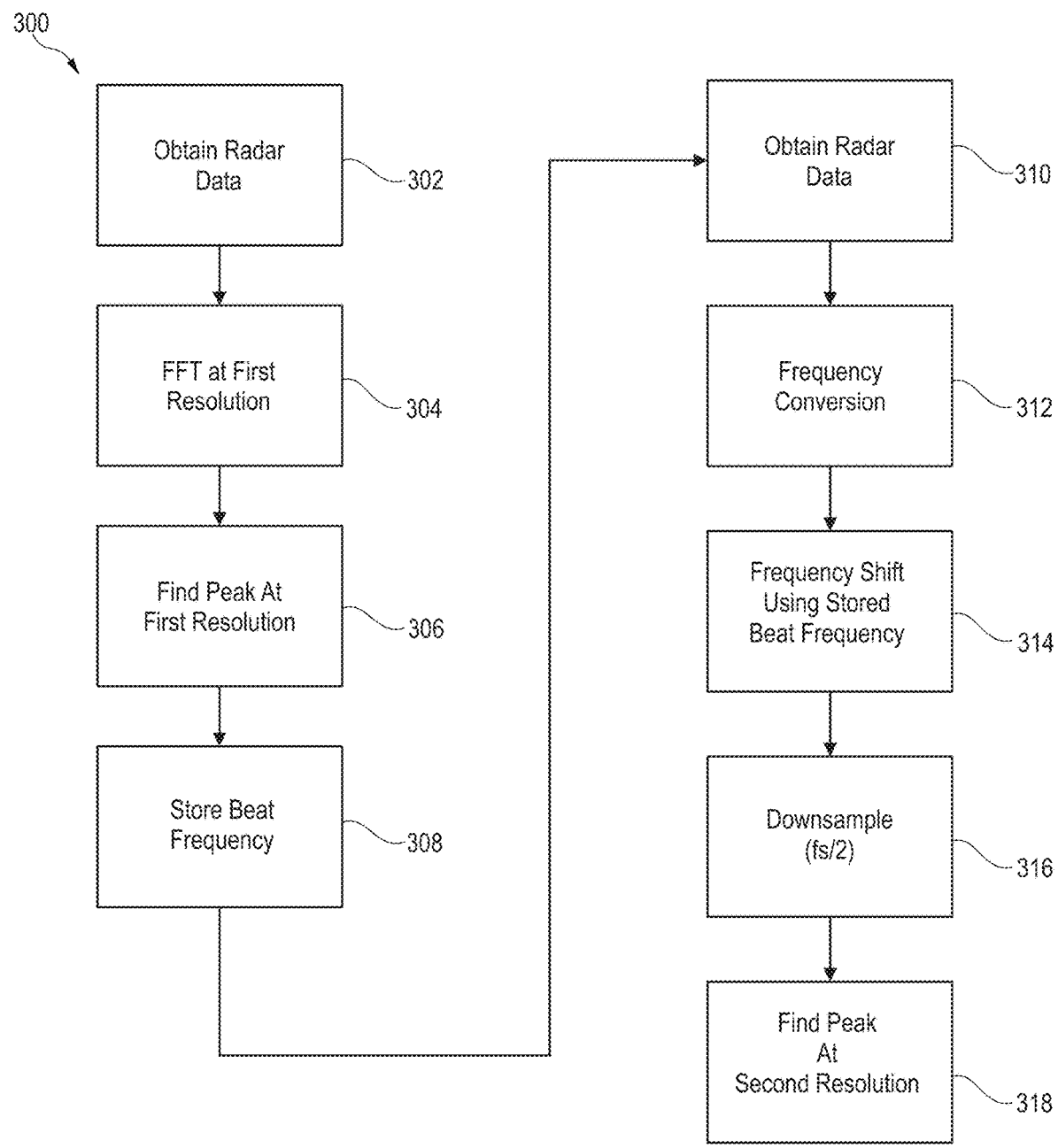
FIG. 3 is a flow chart of an embodiment method.

FIG. 3 is a flow chart 300 of an embodiment method. At step 302 radar data, such as a time based radar return signal, is obtained from a receive signal as described above. At step 304 an FFT is generated at a first (coarse) resolution, including a number of frequency bins generated using a first sampling frequency ($f_s$). The FFT is used to convert the time based receive signal into the frequency domain. At step 306 one or more peaks are found by successively adjusting an amplitude threshold and noting the portions of the frequency domain signal that are above the amplitude threshold. The one or more peaks found at the coarse resolution setting can be displayed or further analyzed. At step 30, the beat frequency ($f_b$) associated with the range of the largest peak is determined and stored.

For FMCW radars, range is calculated below as:

$$R = \frac{CTfb}{2B} \qquad [1]$$

where $f_b$ is the beat frequency, B is bandwidth, T is the ramp period and C is speed of light.

Returning to FIG. 3, at step 310, radar data is again obtained, using the same type of chirp signal previous described. At step 312, a frequency conversion of the new radar data is performed and will be described in further detail below. At step 314 a frequency shift is performed using the stored beat frequency ($f_b$). At step 316, a down-sampling operation is performed at a second sampling frequency ($f_s/2$) to increase frequency resolution during digital signal processing.

In digital signal processing, the output bin spacing ($f_{res}$) is a function of the sample rate ($f_s$):

$$f_{res}=f_s/N \qquad [2]$$

and thus, since a smaller frequency resolution in the spectral calculation is desired for greater resolution, decreasing the sample rate of the data is used to accomplish this goal. While other digital signal processing methods are known, some of these methods may require additional bandwidth that is not allowed under FCC regulations and are thus not described.

At step 318 the largest peak is found at a second (fine) resolution. The largest peak found at the fine resolution setting can be displayed or further analyzed. All of steps 314, 316, and 318 are also described in further detail below.

The second (fine) resolution provides a "zoom" feature in which the distance range of the largest peak can be determined with at least one level of greater accuracy with respect to the distance range using the first (coarse) resolution. An upper limit of how often this zoom feature can be used without "blinding" the radar system used will be determined by the frequency components of the analyzed signals, with a typical upper limit being about once per second. However, this limit can vary given a specific implementation.

Figure 4:
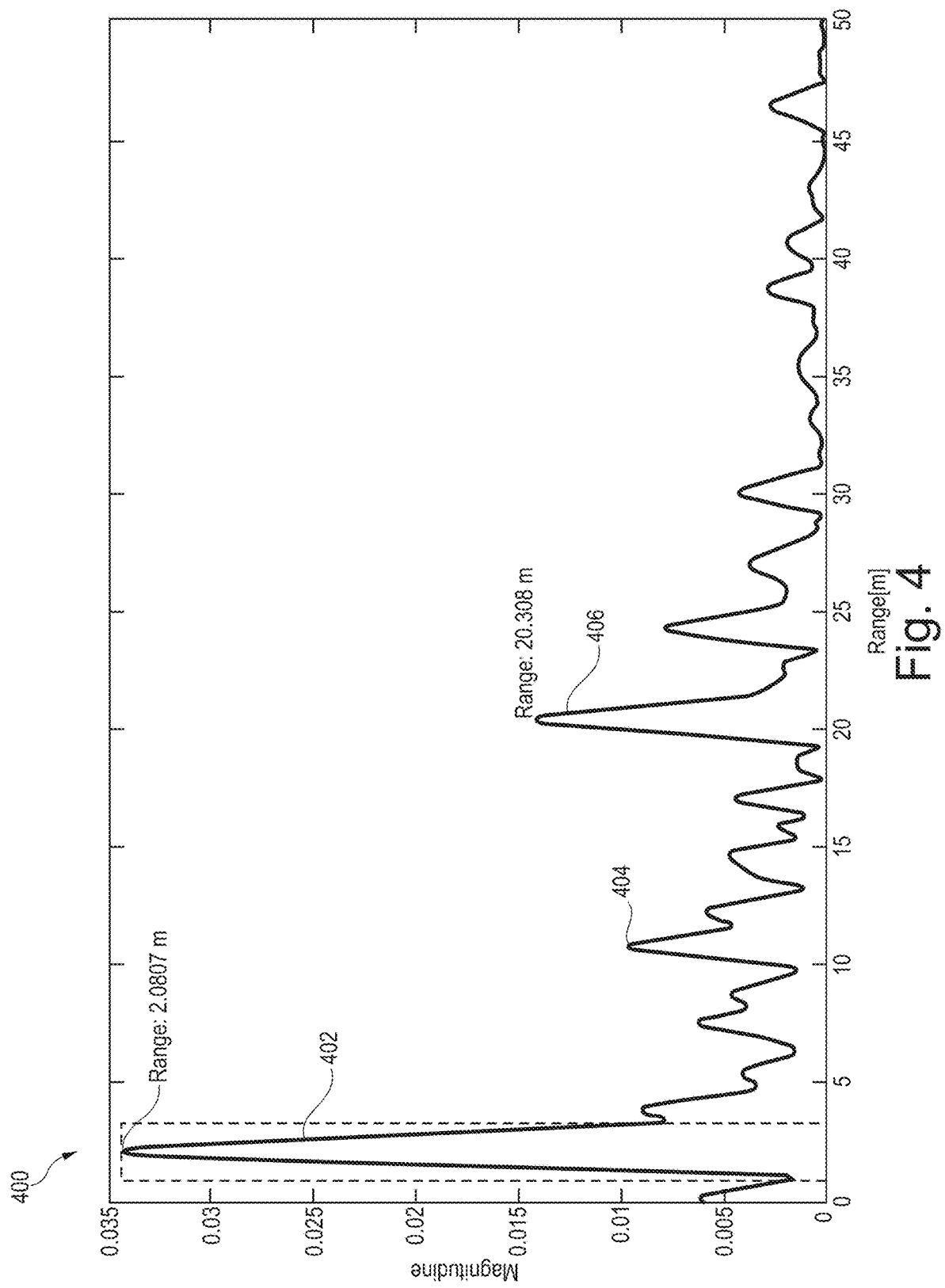
FIG. 4 is a radar output signal showing the magnitude of targets versus range, according to an embodiment.

FIG. 4 is a plot 400 of a representative radar system output signal showing the magnitude of detected peaks 402, 404, and 406 versus range of one or more targets after the bin window of the FFT and adaptive magnitude thresholds are applied. FIGS. 4-8 are representative examples of system behavior and performance and not intended to be limiting. Many other such examples could be constructed for targets at various distances using varying levels of accuracy as described herein.

Returning to FIG. 4, the representative radar system output signal is processed at the coarse resolution setting. A peak 402 is detected at a range of 2.0807 meters, and a peak 406 is detected at a range of 20.308 meters. A spurious peak 404 is detected at a low magnitude level. The low magnitude level peaks (clutter) can be filtered out using an appropriate magnitude threshold if desired.

Figure 5:
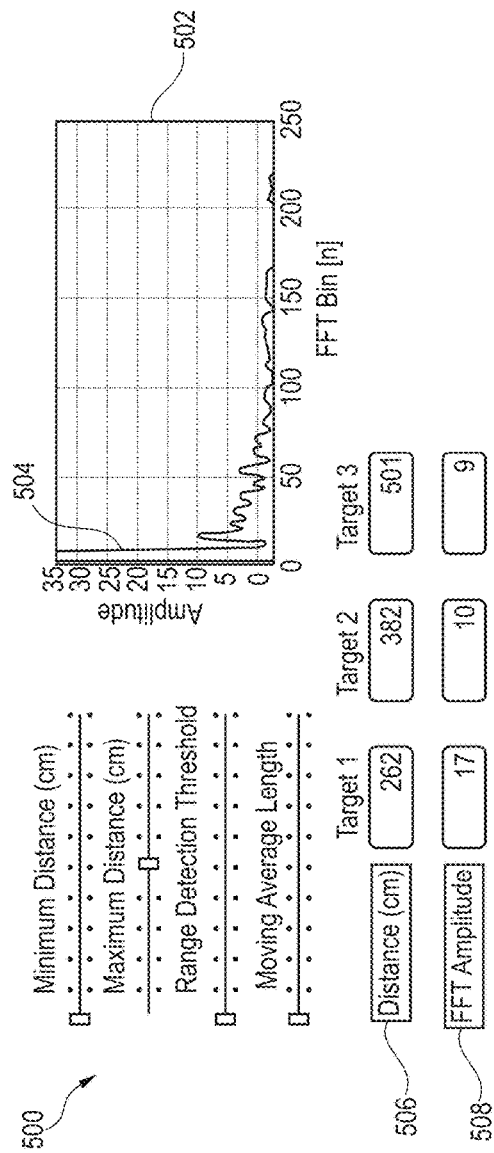
FIG. 5 is a radar output display for a target at one meter, wherein the radar return signal is processed at a first resolution, according to an embodiment.
Figure 6:
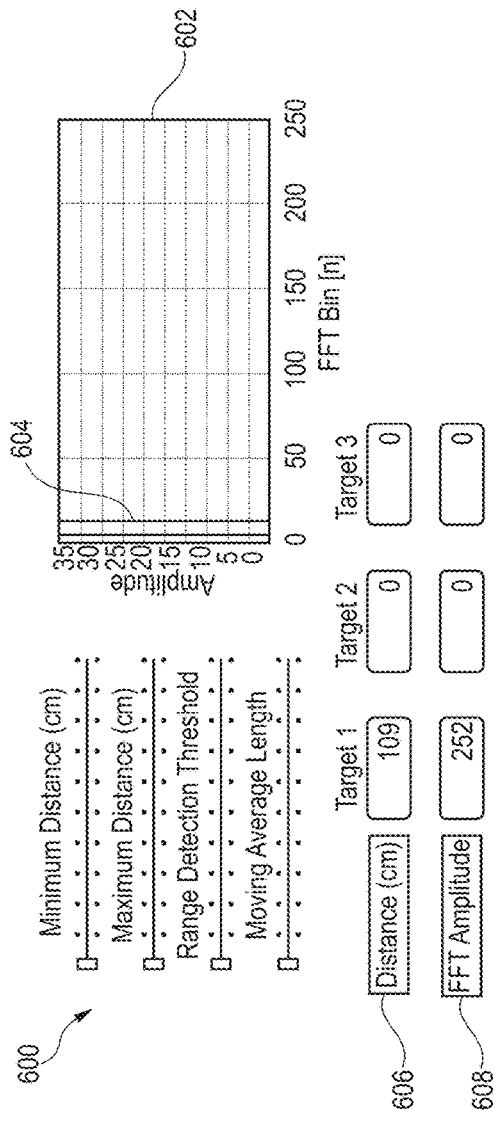
FIG. 6 is a radar output display for the target at one meter as in FIG. 5, wherein the radar return signal is processed at a second resolution, according to an embodiment.

FIGS. 5 and 6 show radar system output signals that are processed and displayed at first (coarse) and second (fine) resolutions for a target at one meter, and FIGS. 7 and 8 show radar system output signals that are processed and displayed at first (coarse) and second (fine) resolutions for a target at ten meters. The displays shown in FIGS. 5-8 are meant to be representative and non-limiting. Other display interfaces can be used as desired. In an embodiment, the displays of FIGS. 5-8 can be computer displays using data provided by the radar system.

FIG. 5 is a radar output display for a target at one meter, wherein the radar return signal is processed at a first (coarse) resolution, according to an embodiment. The radar return signal 504 is displayed on a display 502. A first target is detected at a distance of 262 cm with a relative FFT amplitude of 17. A second target is detected at a distance of 382 cm with a relative FFT amplitude of 10. A third target is detected at a distance of 501 cm with a relative FFT amplitude of 9.

FIG. 6 is a radar output display for the target at one meter as in FIG. 5, wherein the radar return signal is processed at a second (fine) resolution, according to an embodiment. The radar return signal 604 is displayed on a display 602. The target is detected at a distance of 109 cm with a relative FFT amplitude of 252. It should be noted that the target detection is much more accurate (109 cm vs 262 cm for a 100 cm target) using the fine resolution. The results of the coarse target detection can be displayed and the results of the fine target detection can be substituted once the fine resolution digital signal processing has been accomplished. Alternatively, the results of the coarse target detection can be displayed on a first portion of a display and the results of the fine target detection can be displayed on a second portion of the display once the fine resolution digital signal processing has been accomplished.

FIG. 7 is a radar output display for a target at ten meters, wherein the radar return signal is processed at a first (coarse) resolution, according to an embodiment. The radar return signal 704 is displayed on a display 702. A first target is detected at a distance of 193 cm with a relative FFT amplitude of 10. A second target is detected at a distance of 261 cm with a relative FFT amplitude of 9. A third target is detected at a distance of 1132 cm with a relative FFT amplitude of 5.

FIG. 8 is a radar output display for the target at ten meters as in FIG. 7, wherein the radar return signal is processed at a second (fine) resolution, according to an embodiment. The radar return signal 804 is displayed on a display 802. The target is detected at a distance of 995 cm with a relative FFT amplitude of 4. It should be noted that the target detection is much more accurate (995 cm vs 1132 cm for a 100 cm target) using the fine resolution. The results of the coarse target detection can be displayed and the results of the fine target detection can be substituted once the fine resolution digital signal processing has been accomplished. Alternatively, the results of the coarse target detection can be displayed on a first portion of a display and the results of the fine target detection can be displayed on a second portion of the display once the fine resolution digital signal processing has been accomplished.

Figure 9:
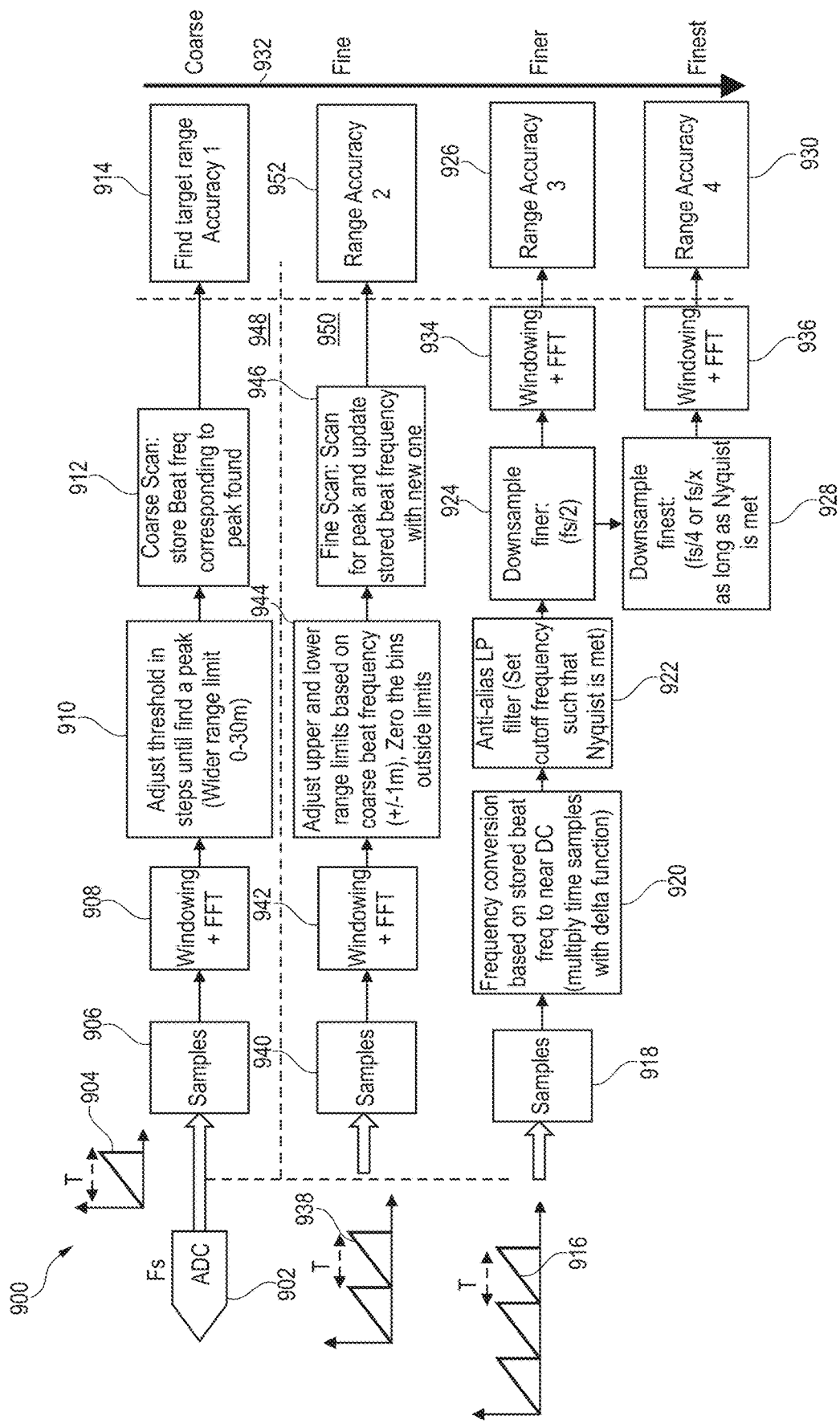
FIG. 9 is a more detailed flow chart than the flow chart of FIG. 3, including details of a data processing circuit and method according to an embodiment.

FIG. 9 is a more detailed flow chart than the flow chart of FIG. 3, including details of a data processing method according to an embodiment. Flow chart 900 includes an ADC 902 and step for sampling the analog receive signal at a sampling frequency of $f_s$ using a first transmit chirp signal 904. Steps 906, 908, 910, 912, and 914 are associated with a first coarse resolution (Accuracy 1). At step 906, the time-based digital samples are collected and stored. At step 908, the time-based digital samples are windowed to remove reflected signals and an FFT is performed at the sampling frequency $f_s$. At step 910, the magnitude threshold is adjusted in steps until at least one peak is found. In an embodiment, a wide range limit of between zero and 30 meters is used. A coarse scan is performed at step 912. Once at least one peak is found, the beat frequency associated with that peak is stored at step 912. At step 914 the target range is found at the coarse resolution (Accuracy 1) and can be displayed.

If desired, the accuracy of the stored beat frequency can be improved using a second transmit chirp signal 938 and processing steps 940, 942, 944, 946, and 952 that can be associated with a second fine resolution (Accuracy 2). At step 940, the time-based digital samples are collected and stored. At step 942, the time-based digital samples are windowed to remove reflected signals and an FFT is performed at the sampling frequency $f_s$. At step 944, the upper and lower range limits of the FFT are adjusted based on the coarse beat frequency. For example, a range of plus or minus one meter can be used, and all of the bins outside of these limits are zeroed out. At step 946, a fine scan can be performed to again scan for the peak and update the stored beat frequency with a new and more accurate beat frequency. At step 952 the target range is found at the fine resolution (Accuracy 2) and can be displayed.

ADC 902 and step are then used for sampling the analog receive signal at a sampling frequency of $f_s$ using a third transmit chirp signal 916. Steps 918, 920, 922, 924, 934, 926, 928, 936, and 930 are associated with third (finer) and fourth (finest) resolutions (Accuracy 3 and Accuracy 4). At step 918, the time-based digital samples are collected and stored.

At step 920, a frequency conversion is performed using the stored beat frequency ($f_b$) to near DC frequency by multiplying the time samples with a delta function. The delta function is for instance given as:

$$\cos(wt) - j*\sin(wt) \qquad [3]$$

wherein "w" is equal to $2*pi*f_b*t$, and wherein $f_b$ is the beat frequency determined in step 912. As is known, multiplying in the time domain is equivalent to convolving in the frequency domain. Thus, for "k" successive time samples, the shifted frequency spectrum $Y_k$ is given as:

$$Y_k = X_k(\text{real})*\cos(wt)_k - j*X_k(\text{real})*\sin(wt)_k. \qquad [4]$$

At step 922, the shifted frequency spectrum is filtered with an anti-aliasing low pass filter to remove higher frequency components. The cutoff frequency is set such that the Nyquist criterion is met.

Downsampling (discarding samples, such as every other sample for a factor of two improvement) step 924 is used to improve range accuracy. Downsampling by a factor of two ($f_s/2$) results in an FFT resolution by a factor of two. While the same number of bins in the FFT are used, they each cover a narrower frequency range by a factor of two. While frequency and range resolution are increased by a factor of two, processing time is increased by a factor of two. It is important to note that the Nyquist criterion should be observed, which dictates that the sample frequency used should be at least twice of the maximum frequency present in the analyzed radar signal. At step 934 the downsampled signal is windowed and an FFT is performed. The range accuracy due to the $f_s/2$ downsampling is improved by a factor of two at step 926 and can be displayed (Range Accuracy 3).

Correspondingly, downsampling step 928 improves frequency resolution by a factor of four, and thus range accuracy is improved by a factor of four at step 930 (Range Accuracy 4). At step 936 the downsampled signal is windowed and an FFT is performed. The range accuracy due to the $f_s/4$ downsampling is improved by a factor of four at step 930 and can be displayed (Range Accuracy 4).

While increasingly accurate range accuracy is possible using steps similar to those described above with respect to Range Accuracy 3 and Range Accuracy 4, the Nyquist criteria and digital signal processing delays impose an upper limit to the number of finer frequency resolution levels that are possible.

The results at steps 914, 952, 926, and 930 can be displayed by updating previous results on a single display, or displayed at the same time in different portions of a display screen. The fine resolution results at step 926 are delayed with respect to at least the coarse resolution results at step 914 since the beat frequency $f_b$ must first be determined before the finer resolution results can be determined. The finest frequency resolution results at step 930 are slightly delayed with respect to the fine frequency resolution results at step 926 due to the longer processing times.

The order of frequency resolution and range accuracy is shown in FIG. 9, wherein the lowest resolution and range accuracy (Accuracy 1) is shown at the top of arrow 932, whereas the highest resolution and range accuracy (Accuracy 4) is shown at the bottom of arrow 932.

Portion 948 of flow chart 900 is thus generally associated with a "normal" mode of operation having a base line level of accuracy and range resolution, whereas portion 950 of flow chart 900 is generally associated with a "zoom" mode of operation having increasing levels of accuracy and range resolution as has been described herein.

Figure 10:
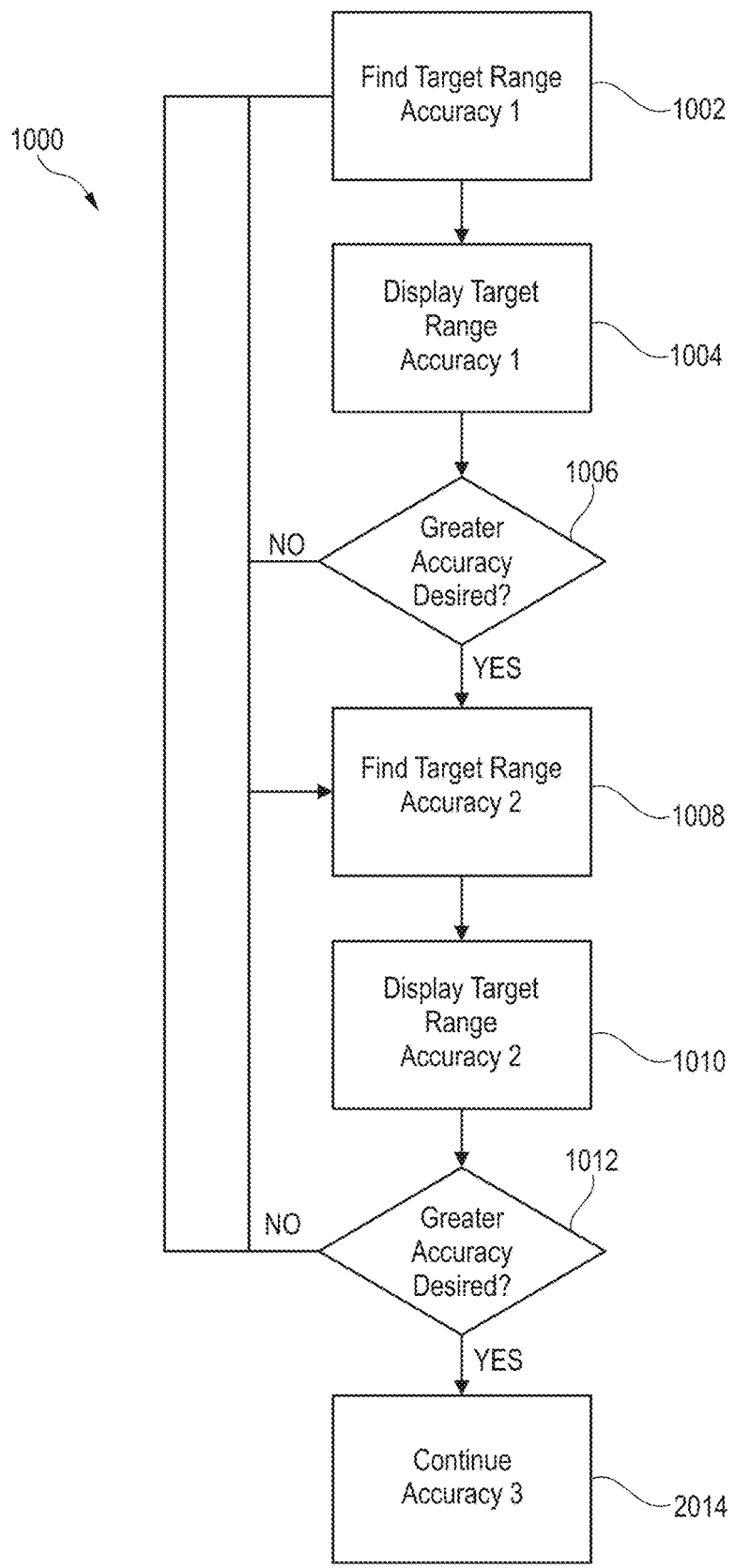
FIG. 10 is a flow chart of a display method for displaying various resolution target ranges, according to an embodiment.

FIG. 10 is a flow chart of a display method for displaying various resolution target ranges, according to an embodiment. If the beat frequency is not updated, then steps 1002, 1004, and 1006 are generally associated with steps 906, 908, 910, 912, and 914 shown in FIG. 9. Steps 1008, 1010, and 1012 are generally associated steps 918, 920, 922, 924, 934, and 926 shown in FIG. 9. Step 1014 is generally associated with steps 928, 936, and 930 shown in FIG. 10.

Returning to FIG. 10, at step 1002 the target range for a first level of accuracy is determined. At step 1004 the determined target range is displayed. Interrogation step 1006 asks whether or not greater accuracy than the accuracy provided by the first level of accuracy is desired. If not, the target range can continue to be determined with the first level of accuracy. If yes, then the target range for a second, more accurate, level of accuracy is determined. At step 1010 the determined target range is displayed. Interrogation step 1012 asks whether or not even great accuracy than the accuracy provided by the second level of accuracy is desired. In no, the target range can continue to be determined with the second level of accuracy, or the target range can continue to be determined with the first level of accuracy. If yes, then the target range for a third, even more accurate, level of accuracy is determined and displayed at step 1014. Even further levels of accuracy can be implemented as discussed above.

The levels of accuracy shown in FIG. 10 can correspond to any combination of increasing levels of accuracy shown in FIG. 9.

In embodiments, all of the above display results can be substituted for a previous result or displayed in portions of a display device. The answers to the interrogation steps 1006 and 1012 can be provided by an operator viewing the displayed results, automatically determined using predetermined criteria, or automatically determined by the occurrence of events.

Figure 11:
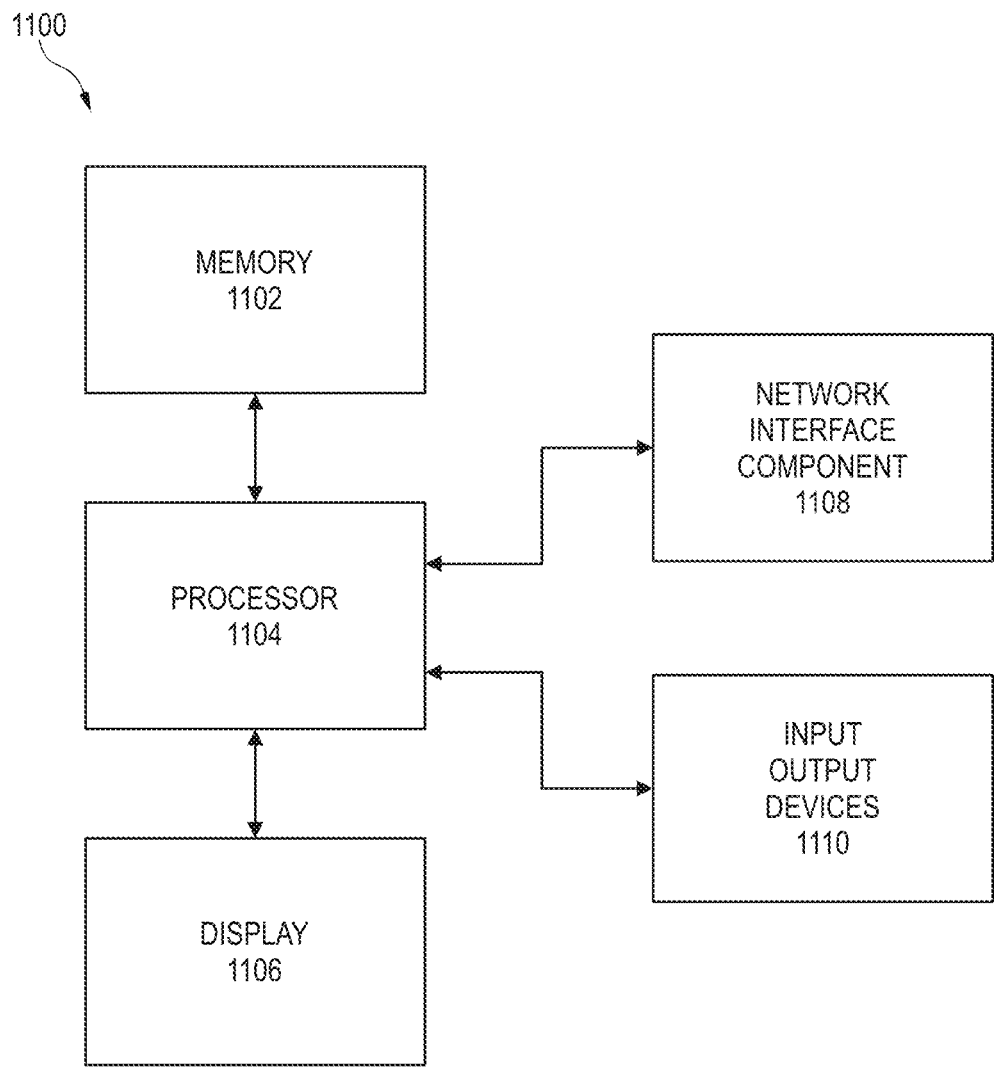
FIG. 11 is a block diagram of a computer system suitable for implementing the data processing circuit of FIG. 9.

FIG. 11 is a block diagram of a computer system 1100 suitable for implementing the data processing circuitry shown in FIG. 9. Computer system 1100 includes a processor or processors 1104 in communication with a memory block 1102 including volatile and/or nonvolatile storage. Processor 1104 is also in communication with one or more display devices 1106. Processor 1104 can be in communication with network interface component 1108 to provide access to the internet or to an internal network, or to cloud storage or other cloud applications. Finally, processor 1104 is also in communication with a number of input and/or output devices for inputting and exporting data. Communication paths shown in FIG. 11 can be implemented using a serial data bus or a parallel data bus.

The computer system 1100 of FIG. 11 could be implemented as a specific hardware device dedicated to implementing the radar signal processing circuitry shown in FIG. 9. Alternatively, the computer system could be a general purpose computer including a processor programmed for executing instructions stored on a non-transitory computer readable medium. The computer system 1100 can be implemented as combinations of hardware, software, and firmware. The computer system 1100 can be also implemented using available computer components such as server computers, memory modules, and display devices including a single screen having configurable display areas or multiple screens.

In an embodiment, range accuracy improvement as described herein can be attained with only a nominal increase in processing resources. For example, in an embodiment, only a digital signal processing block normally associated with an FMCW radar system need be modified, and the existing transmit, receive, and other radar signal processing hardware need not be modified.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for determining a range of a target comprising:
    a) receiving a first time based radar return signal;
    b) converting the first time based radar return signal into a first frequency domain signal;
    c) detecting a peak of the first frequency domain signal, the peak corresponding to a coarse target range;
    d) receiving a second time based radar return signal;
    e) using the detected peak of the first frequency domain signal and the second time based radar return signal, converting the second time based radar return signal into a second frequency domain signal; and
    f) detecting a peak of the second frequency domain signal, the peak corresponding to a fine target range.

2. The method of claim 1, wherein converting the second time based radar return signal into a second frequency domain signal comprises converting the second time based radar return signal into a frequency domain signal that is low frequency shifted with respect to the first frequency domain signal, wherein an amount of frequency shift is determined by the peak of the first frequency domain signal.

3. The method of claim 1, wherein converting the second time based radar return signal into a second frequency domain signal comprises multiplying the second time based radar return signal by a delta function.

4. The method of claim 1, wherein converting the second time based radar return signal into a second frequency domain signal comprises using a beat frequency associated with the detected peak of the first frequency domain signal.

5. The method of claim 1, wherein steps a), b), and c) forms a first sequence of steps which is repeatedly performed, and steps d), e), and f) forms a second sequence of steps, the second sequence of steps being triggered by operator input, predetermined criteria, or the occurrence of an event.

6. The method of claim 5, wherein the second sequence of steps is performed less than once per second.

7. The method of claim 1, further comprising low pass filtering the second frequency domain signal.

8. A method for determining the range of a target, the method comprising:
obtaining a first radar return frequency signal;
finding a first target range using a first frequency resolution for analyzing the first radar return frequency signal;
storing a beat frequency associated with the first target range;
receiving a trigger;
thereafter, obtaining a second radar return frequency signal; and
finding a second target range using the beat frequency and a second frequency resolution for analyzing the second radar return frequency signal.

9. The method of claim 8, wherein obtaining the first radar return frequency signal comprises:
obtaining a first radar return time based signal;
sampling the first radar return time based signal; and
transforming the first radar return time based signal into the first radar return frequency signal.

10. The method of claim 8, wherein receiving a trigger comprises receiving an operator input, satisfaction of predetermined criteria, or the occurrence of an event.

11. The method of claim 8, wherein obtaining the second radar return frequency signal comprises:
obtaining a second radar return time based signal;
multiplying the second radar return time based signal with a delta function to generate an intermediate frequency signal;
filtering the intermediate frequency signal; and
downsampling the intermediate frequency signal.

12. The method of claim 8, further comprising frequency shifting the second radar return frequency signal.

13. The method of claim 8, further comprising:
obtaining a third radar return frequency signal; and
finding a third target range using the beat frequency and a third frequency resolution for analyzing the third radar return frequency signal.

14. A radar system comprising:
a receiver for receiving first and second time based radar return signals; and
processing circuitry coupled to the receiver configured for converting the first time based radar return signal into a first frequency domain signal; detecting a peak of the first frequency domain signal, the peak corresponding to a coarse target range; using the detected peak of the first frequency domain signal and the second time based radar return signal, converting the second time based radar return signal into a second frequency domain signal; and detecting a peak of the second frequency domain signal, the peak corresponding to a fine target range.

15. The radar system of claim 14, wherein the processing circuitry is configured for converting the second time based radar return signal into a frequency domain signal that is low frequency shifted with respect to the first frequency domain signal, wherein an amount of frequency shift is determined by the peak of the first frequency domain signal.

16. The radar system of claim 14, wherein the processing circuitry is configured for multiplying the second time based radar return signal by a delta function.

17. The radar system of claim 14, wherein the processing circuitry is configured for converting the second time based radar return signal into a second frequency domain signal using a beat frequency associated with the detected peak of the first frequency domain signal.

18. The radar system of claim 14, wherein the processing circuitry is configured for repeatedly detecting the peak of the first frequency domain signal, and configured for detecting the peak of the second frequency domain signal when triggered by operator input, predetermined criteria, or the occurrence of an event.

19. The radar system of claim 18, wherein the processing circuitry is configured to detect the peak of the second frequency domain signal less than once per second.

20. The radar system of claim 14, wherein the processing circuitry further comprises a low pass filter for filtering the second frequency domain signal.

* * * * *